No. 862,503. PATENTED AUG. 6, 1907.
W. T. NICHOLLS.
MANUFACTURE OF GLASS SHEETS.
APPLICATION FILED JUNE 23, 1906.
3 SHEETS—SHEET 1.
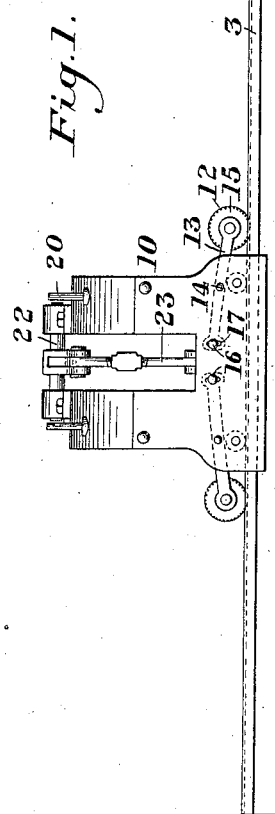
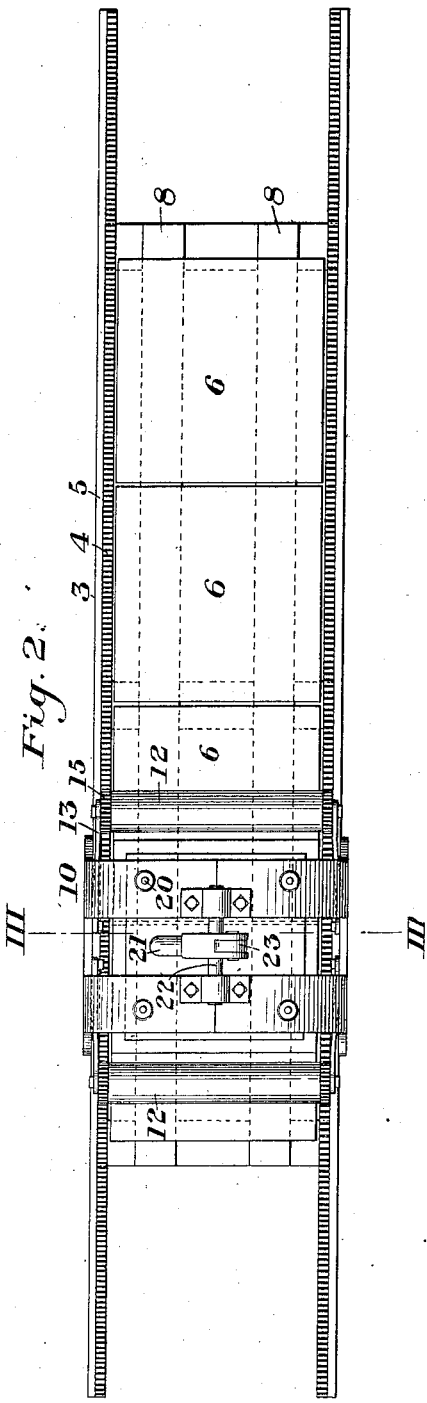
WITNESSES
INVENTOR No. 862,503. PATENTED AUG. 6, 1907.
W. T. NICHOLLS.
MANUFACTURE OF GLASS SHEETS.
APPLICATION FILED JUNE 23, 1906.

3 SHEETS—SHEET 2.

WITNESSES

INVENTOR

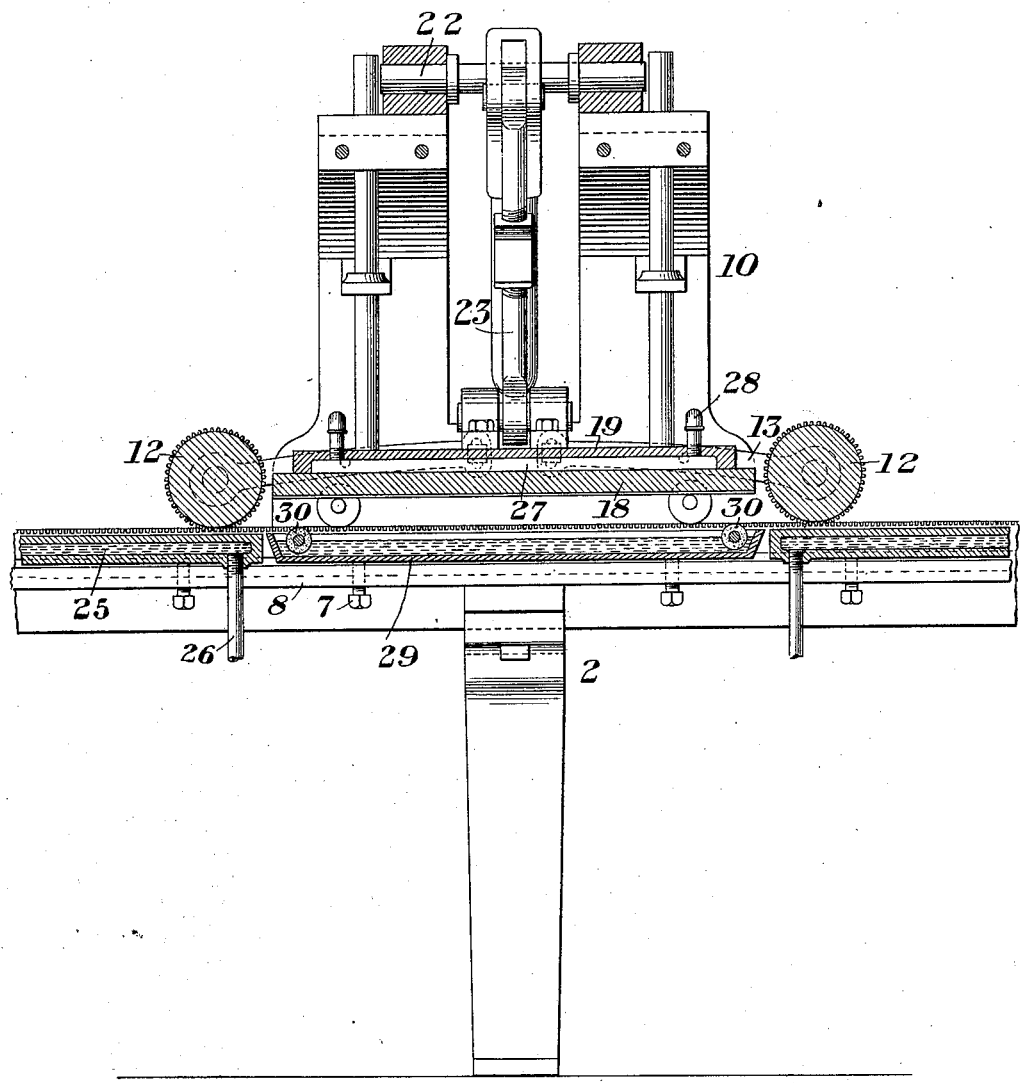

UNITED STATES PATENT OFFICE.

WILLIAM T. NICHOLLS, OF WELLSBURG, WEST VIRGINIA, ASSIGNOR TO THE MONARCH TILE COMPANY, OF WESTON, WEST VIRGINIA, A CORPORATION OF WEST VIRGINIA.

MANUFACTURE OF GLASS SHEETS.

No. 862,503.     Specification of Letters Patent.     Patented Aug. 6, 1907.

Application filed June 23, 1906. Serial No. 323,174.

*To all whom it may concern:*

Be it known that I, WILLIAM T. NICHOLLS, of Wellsburg, Brooke county, West Virginia, have invented a new and useful Improvement in the Manufacture of Glass Sheets, of which the following is a full, clear, and exact description, reference being had to the accompanying drawings, forming part of this specification, in which—

Figure 3:
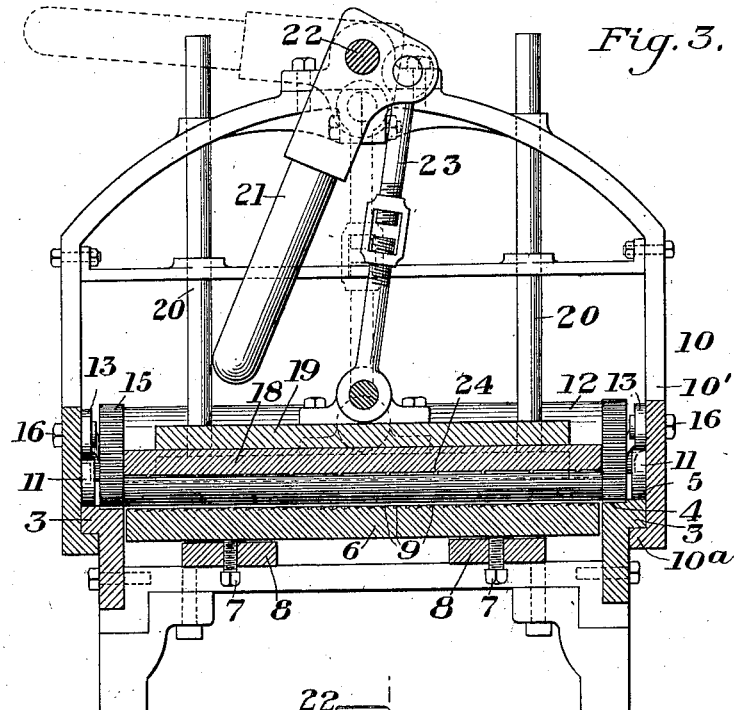
Figure 4:
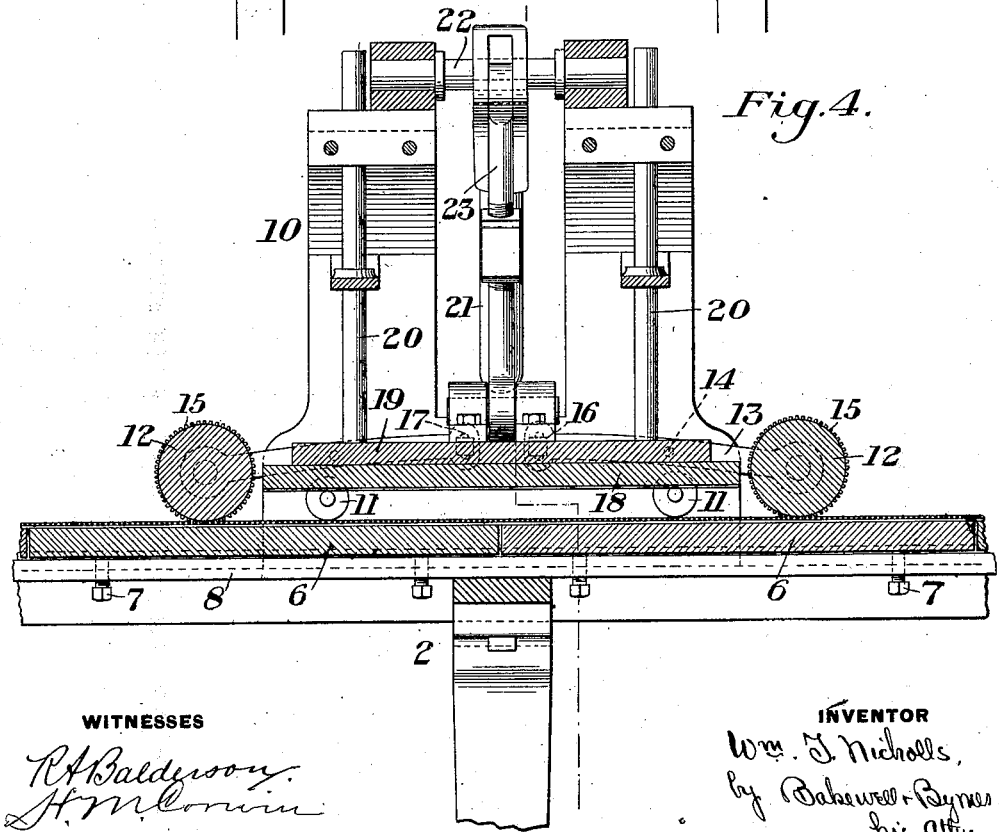

Figure 1 is a side elevation of one form of apparatus embodying my invention; Fig. 2 is a plan view of the same; Fig. 3 is a transverse section on the line III—III of Fig. 2 but on a larger scale; Fig. 4 is a longitudinal vertical section, the table and its support being partly broken away; and Fig. 5 is a similar view showing a modification.

My invention has relation to the manufacture of glass sheets, and is designed to provide the method of and apparatus by means of which a sheet may be formed by combined rolling and pressing action, the sheet being plain or figured upon one or both surfaces, as may be desired.

In accordance with my improved method, I roll a sheet of glass upon the surface of a table, which surface may be either plain or figured, and by the operation of rolling bring the rolled sheet as soon it is completed underneath a platen or press, which further flattens and forms the sheet, and which may at the same time be provided with cutters for severing or partially severing the sheet into the desired shapes, as in the manufacture of tiles, or which may have any suitable configuration which it may be desired to impart to the upper surface of the sheet. I prefer to employ a succession of tables in connection with a single rolling and pressing device, upon which the described operations may be performed successively, the formed sheet or articles being removed from one table while the forming operations are taking place upon a succeeding table.

In one form of my invention, I also provide means for cooling or partially cooling the platen or press, or the forming surface thereof, and also the table surfaces, to prevent their becoming too highly heated.

My invention also consists in the various novel steps, and in the novel construction, arrangement and combination of parts all substantially as hereinafter described and pointed out in the appended claims.

In the accompanying drawings, the numeral 2 designates the supporting frame of a glass rolling table having side bars 3 formed at their upper edges with the longitudinal toothed racks 4 and the track surfaces 5. Between these side bars are supported a series of table sections 6, which are arranged to be leveled and also adjusted for the purpose of varying the thickness of the glass sheets to be formed thereon by means of adjusting screws 7, which are seated in the longitudinal bars 8.

In Fig. 3 I have shown the upper surface of the table as formed with undercut recesses or grooves 9 adapted to form undercut projections on the lower surface of the sheet, but the table sections may be flat, or may have any other desired configuration which it may be desired to impart to the sheets.

10 designates a carriage which is adapted to traverse the table longitudinally, and which is mounted upon rollers 11 which travel on the track surfaces 5 of the side bars 3. The side frames 10' of the carriage are provided with lips 10ª at their lower ends which engage underneath the upper flanges of the side bars 3 for the purpose of holding the carriage to the table and guiding its movement.

A transverse roller 12 is mounted at each end of the carriage in advance of the same in lateral arms 13 which are pivoted to the carriage at 14, the ends of the rollers having gear wheels 15 whose teeth mesh with the rack teeth 4. The inner ends of the arms 13 are adjustably secured by means of bolts 16 engaging slots 17, whereby a slight vertical adjustment of the rollers is permitted.

Mounted in the carriage, between the two rollers 12, is a press or platen 18 having an under surface of substantially the same area as that of each of the table sections 6. This press or platen plate is removably secured to a carrier plate 19 which is arranged to move vertically, being provided with guide rods 20. For the purpose of actuating the carrier to move the press or platen towards and away from the table sections, I provide a lever 21 which is fulcrumed at 22 to the frame of the carriage and whose shorter arm is connected by an adjustable link 23 to the said carrier plate. The under side of the press or platen plate may be plain, or it may have any suitable configuration thereon, or it may be, as shown in Fig. 3, provided with cutting ribs 24, which are adapted to penetrate the glass sheet and sever or partially sever the same to any suitable shapes, such as tiles.

The press or platen plate, together with the table sections, are so arranged as to be readily removable, so that the plates and sections of different patterns may be interchangeably used.

The operation is as follows:—A sheet of glass is spread and rolled upon one of the table sections. As the roller completes its operation, the rolled sheet is immediately below the press or platen 18, which is now depressed by the operation of the lever 21 to further form the sheet while it is in plastic condition and to impart the desired configuration or lines of severance thereto. This being done, the platen is raised and the carriage is moved to the next section, where the operations are repeated, an operator in the mean time removing the previously formed sheet from the first table section. This operation is repeated as to each, or as many of the table sections as may be desired.

It will be noted that the carriage can be operated in either direction in the operation of rolling.

In the modification shown in Fig. 5, the construction is in general the same as that shown in Figs. 1 to 4, but means are provided for cooling or partially cooling the platen and table surfaces. In this form the table sections are provided with contained water chambers or circulating passages 25 supplied by circulating pipes 26. Water chamber or water circulating passages 27 may also be provided between the press or platen plate 18 and the carrier plate 19, said chamber or passage being supplied with circulating passages 28, which, in the operation of the machine, are connected with a source of supply by means of flexible pipes, (not shown), which move with the carriage. The forming surface of the press or platen may further be cooled by omitting one of the table sections 6, and supporting in place thereof a water pan 29 in which are journaled rollers 30 having a covering of moistened absorbent material such as felt, and which turn partially within the water in the pan. The press or platen plate can be lowered at any time into contact with these rollers and moved back and forth over the same until it becomes cooled to the desired extent.

The advantages of my invention consist in the method and means by which the operation of rolling the sheet leaves or brings the sheet in position to be immediately acted upon by a press or platen which completes the forming operation while the glass is in proper plastic condition; also in the arrangement whereby the press or platen is carried by and moves with the roller carriage; also in the arrangement of the successive table sections whereby the operations may be rapidly performed, no delay in the rolling and pressing being necessary, while the previously formed sheets or articles are being removed.

I believe it is broadly new to mount a press or platen on the roller carriage of glass rolling apparatus, so that the platen will move horizontally with the forming roller or rollers, and also have an independent vertical movement towards and away from a fixed forming surface or table. By moving the press or platen horizontally with the roller or rollers, the rolled sheet is brought, by the rolling operation, and without transfer, into position to be at once acted upon by the press or platen; while by an independent vertical movement of the press or platen, I avoid the necessity for moving the table with its load of glass. The pressing operation may, therefore, be effected with much less power, especially as gravity assists in the operation. The press, being lighter, can also be more accurately guided, and more perfect work results.

Various changes and modifications may be made in the apparatus which I have herein shown and described without departing from the spirit and scope of my invention, since

What I claim is:—

1. In the manufacture of glass sheets, the method which consists in rolling a sheet of glass upon a fixed forming surface, and by the same operation moving a press in a horizontal direction to bring it over the rolled sheet without moving the latter, and then moving the press downwardly toward the fixed forming surface to press the sheet thereon; substantially as described.

2. In the manufacture of glass sheets, the method which consists in rolling successive sheets upon adjacent table surfaces, pressing each sheet upon such surfaces as soon as it is rolled, and removing the formed articles from each table surface while the rolling and pressing operations are being carried on upon a succeeding table surface; substantially as described.

3. Apparatus for the manufacture of glass sheets, having a spreading table on which the glass is rolled, a roll, and a press or platen, the said roll and the press or platen being mounted on the same carriage, and the press or platen being arranged to move vertically on the carriage towards and away from the table the parts being so arranged that the operation of rolling leaves the rolled sheet in position to be operated upon by the press or platen without transfer; substantially as described.

4. Apparatus for the manufacture of glass sheets, having a spreading table upon which the glass is rolled, a roll, and a press or platen movable with the roll said roll and the press or platen being mounted on the same carriage, and the press or platen being vertically movable in guides on the carriage; substantially as described.

5. Apparatus for the manufacture of glass sheets, having a plurality of separate table sections or surfaces arranged in line with each other, a carriage arranged to traverse a series of sections or surfaces, a forming roll and a press or platen, said roll and platen being carried by the carriage; substantially as described.

6. In apparatus for manufacturing glass sheets, a forming table, a carriage having a forming roll at each end thereof, and a vertically movable press or platen between the rolls; substantially as described.

7. In apparatus for the manufacture of glass sheets, a forming table, a carriage arranged to traverse the same, a forming roll on the carriage, a movable press or platen also mounted on the carriage, to move horizontally therewith, and also to have an independent vertical movement and means for moving the press or platen towards and away from the table; substantially as described.

8. In apparatus for the manufacture of glass sheets, a rolling table having a water-pan, rollers journaled in said pan, and a movable carriage arranged to traverse the table and having a press plate or platen arranged to be brought into contact with said rollers; substantially as described.

9. Apparatus for the manufacture of glass sheets, having a spreading table upon which the glass is rolled, a roll, a press or platen arranged to move longitudinally with the roll and also vertically towards and away from the table, and means for applying power to the press or platen; substantially as described.

10. Apparatus for the manufacture of glass sheets, having a spreading table upon which the glass is rolled, a roll, a press or platen arranged to move longitudinally with the roll and also vertically towards and away from the table, means for applying power to the press or platen, and means for obtaining a vertical adjustment of the table; substantially as described.

11. In apparatus for the manufacture of glass sheets, a relatively fixed forming surface, a carriage mounted to traverse said surface, a roll journaled transversely at each end portion of the carriage, a vertically movable press or platen mounted in the carriage between the rolls, and means for applying power to the press or platen; substantially as described.

In testimony whereof, I have hereunto set my hand.

WILLIAM T. NICHOLLS.

Witnesses:
S. M. NEASE,
J. R. MILLER.